July 16, 1963  C. VAN DER LELY  3,097,470
IMPLEMENTS FOR WORKING MATERIAL LYING ON THE GROUND
Filed Aug. 5, 1960  6 Sheets-Sheet 1
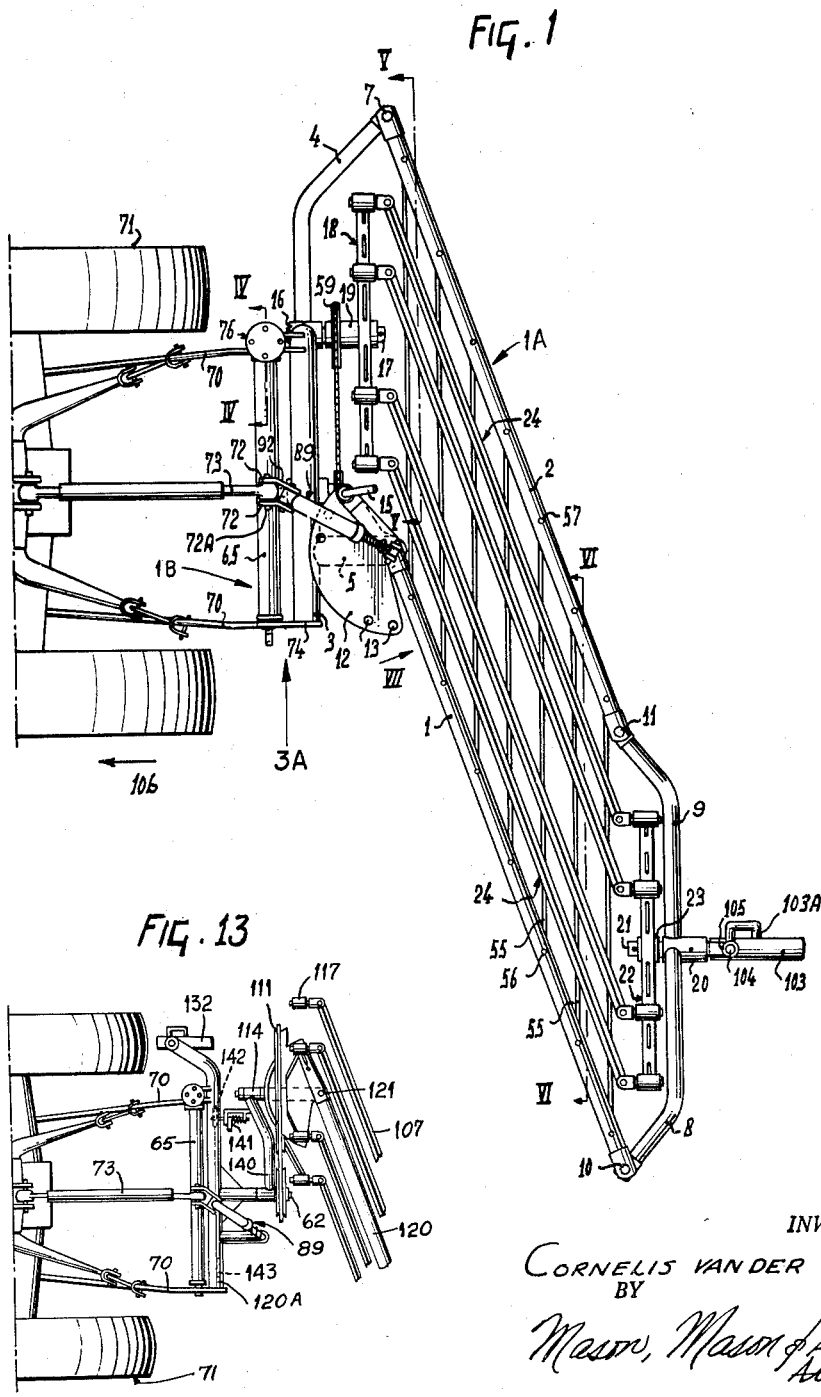
INVENTOR.
CORNELIS VAN DER LELY
BY
Mason, Mason & Albright
Attorneys

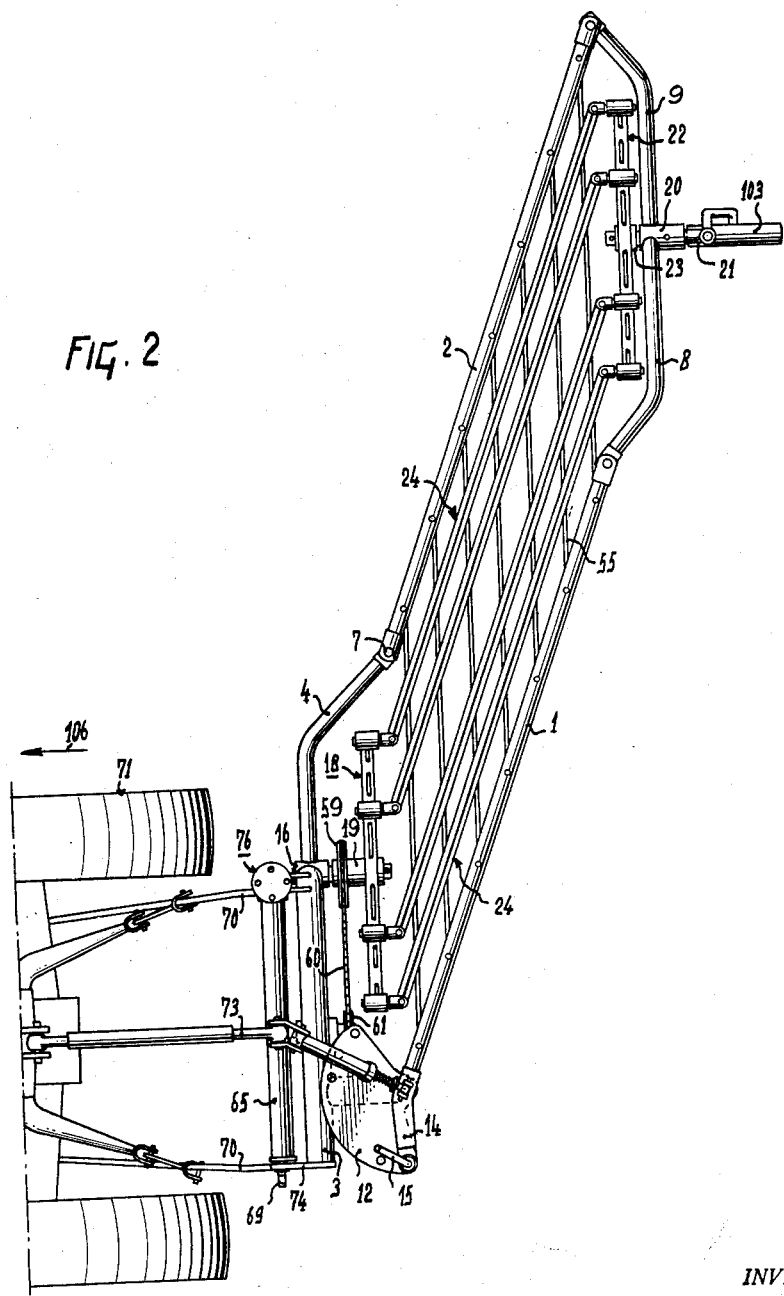

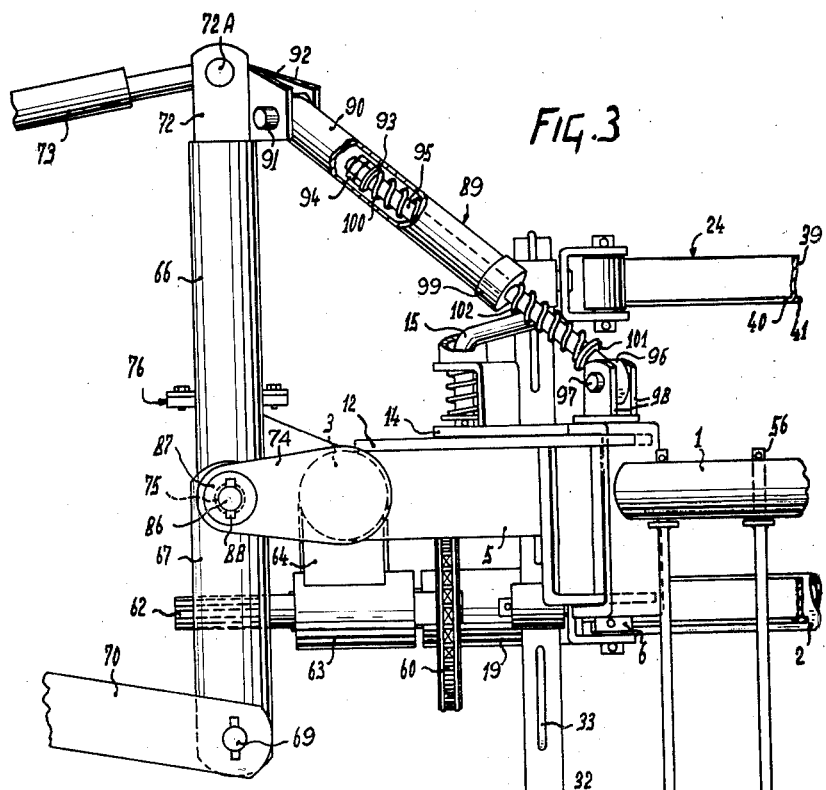
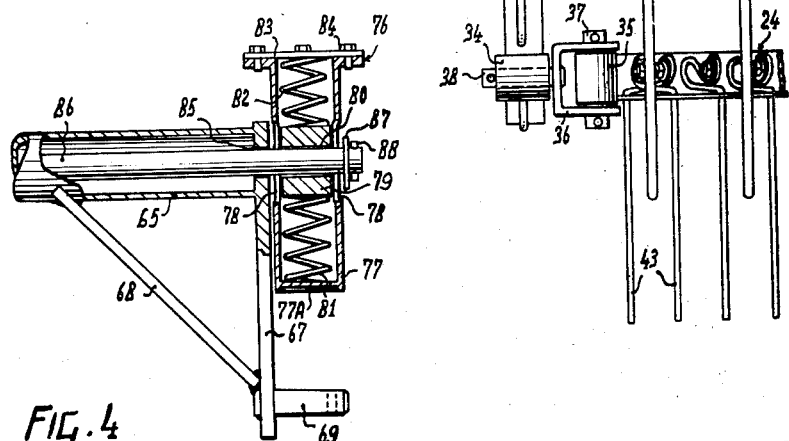

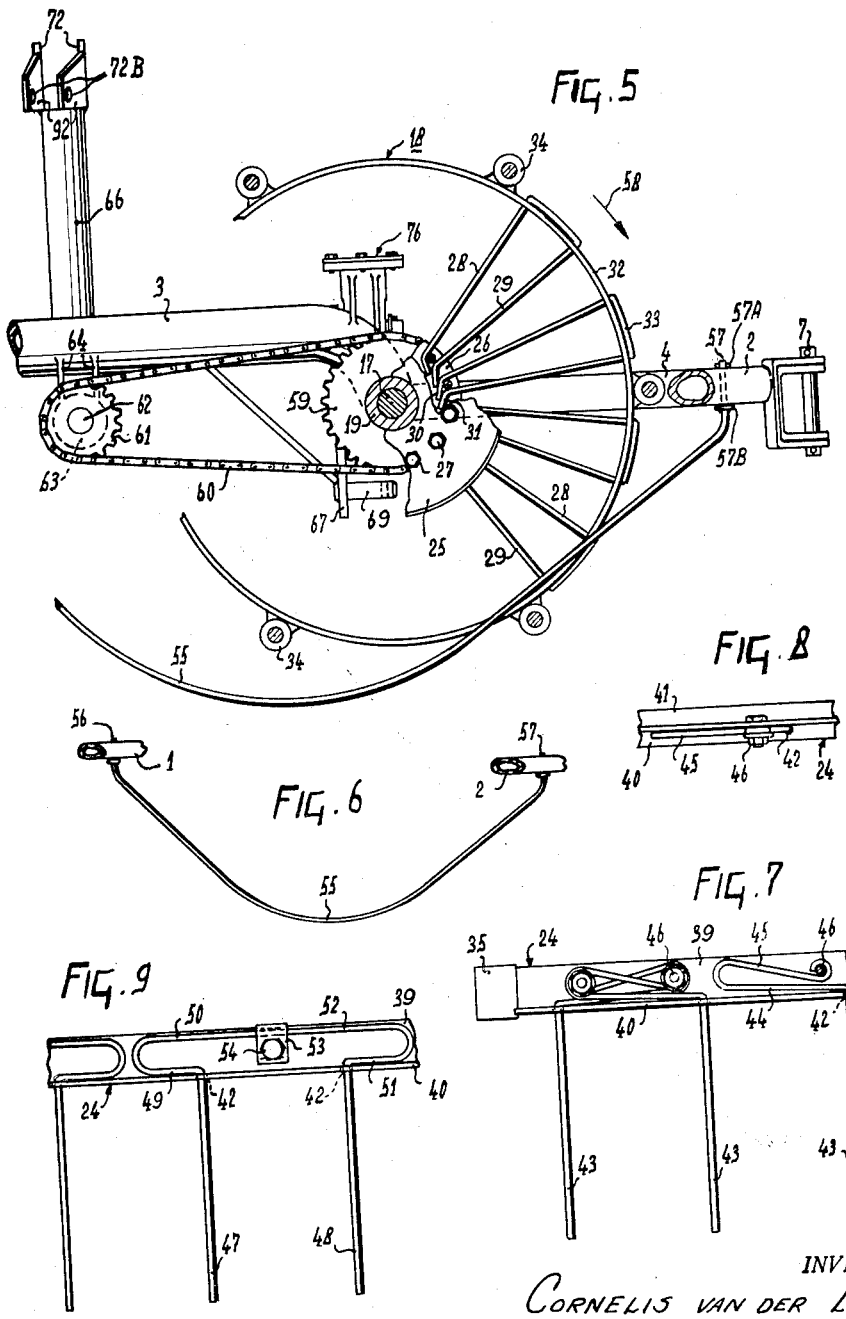

July 16, 1963 C. VAN DER LELY 3,097,470
IMPLEMENTS FOR WORKING MATERIAL LYING ON THE GROUND
Filed Aug. 5, 1960 6 Sheets-Sheet 6

INVENTOR.
CORNELIS VAN DER LELY
BY
Mason, Mason & Albright
Attorneys

United States Patent Office 3,097,470
Patented July 16, 1963

3,097,470
IMPLEMENTS FOR WORKING MATERIAL
LYING ON THE GROUND
Cornelis van der Lely, Zug, Switzerland, assignor to Patent Concern N.V., Willemstad, Curacao, Netherlands Antilles, a limited-liability company
Filed Aug. 5, 1960, Ser. No. 47,796
Claims priority, application Netherlands Aug. 25, 1959
18 Claims. (Cl. 56—366)

This invention relates to an implement for working material lying on the ground, the implement being of the kind having a frame which supports one or more rake members arranged to be driven, upon movement of the implement, in such a manner as to work the material, the frame being adapted to be coupled at one end to a tractor or the like for moving the implement over the ground.

According to the present invention, there is provided an implement of the kind set forth, wherein the implement is arranged to occupy a first and a second working position, and wherein the frame includes a part (hereinafter referred to as "said first frame part") which is adapted to be horizontally or substantially horizontally adjustable and to be fixable in a number of angular settings with respect to the tractor or the like in order to bring the implement from one working position to the other, the arrangement being such that in any setting corresponding to the first working position, said first frame part extends to the left and in any setting corresponding to the second working position, said first frame part extends to the right, with reference to the intended direction of travel of the implement, and being such that the side of each rake member which faces the material to be worked when the implement occupies the first working position, is remote from the crop to be worked when the implement occupies the second working position.

Figure 10:
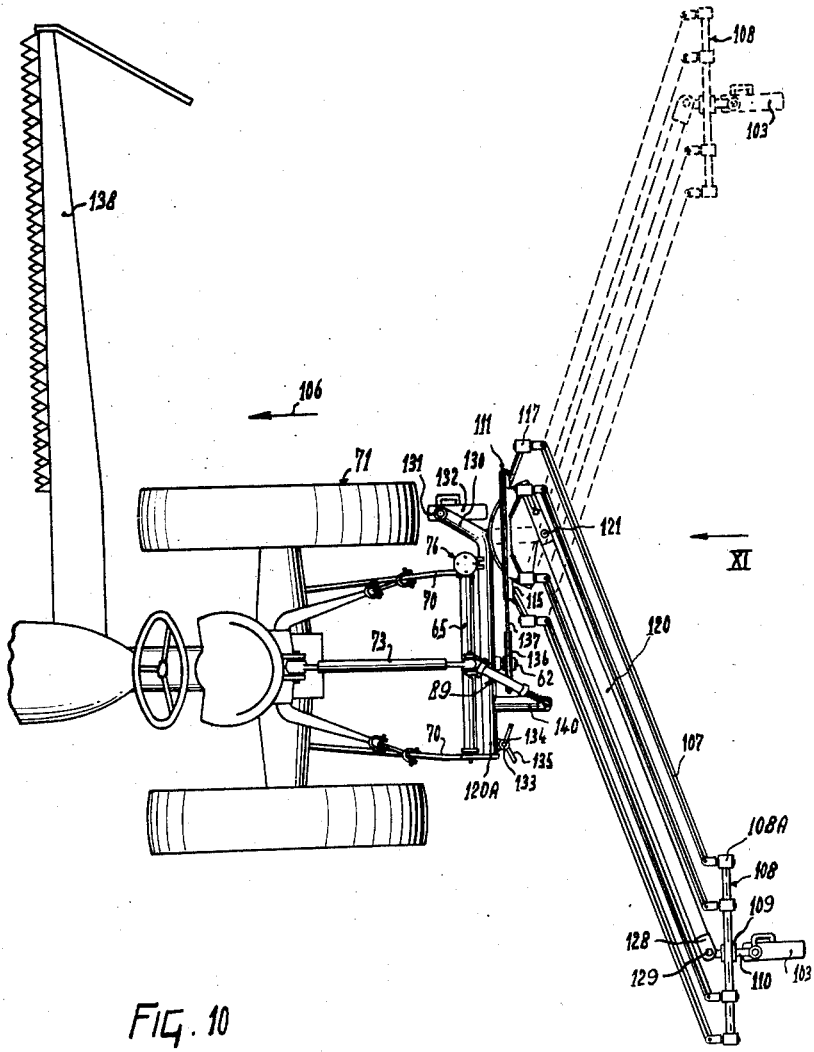
Figures 11, 12:
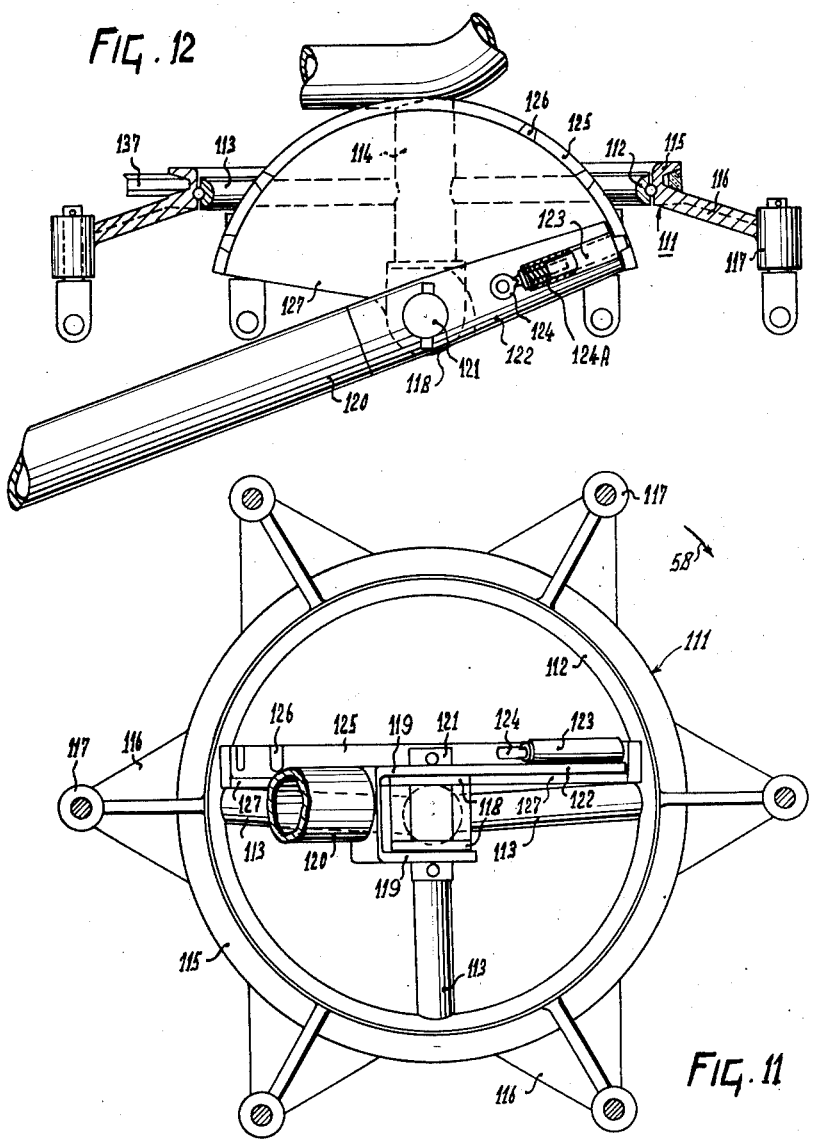

For a better understanding of the invention and to show how the same may be carried into effect, reference will now be made by way of example to the accompanying drawings, in which:

FIGURE 1 is a plan of a first embodiment of an implement, shown in a first working position, and coupled to a tractor, FIGURE 2 is a plan similar to FIGURE 1, but showing the implement in a second working position, FIGURE 3 is, on an enlarged scale, an elevation of a first part of the implement shown in FIGURE 1, as seen from the arrow 3A in FIGURE 1 with the parts broken away and showing in section, FIGURE 4 is, on an enlarged scale, a section of a second part of the implement shown in FIGURE 1, taken along the line IV—IV in FIGURE 1, FIGURE 5 is, on an enlarged scale, a section of a third part of the implement shown in FIGURE 1, taken along the line V—V in FIGURE 1, FIGURE 6 is, on the same scale as FIGURE 1, an elevation of a fourth part of the implement as seen from the line VI—VI in FIGURE 1, FIGURE 7 is, on an enlarged scale, an elevation of a fifth part of the implement shown in FIGURE 1, viewed in the direction of the arrow VII in FIGURE 1, FIGURE 8 is, on the same enlarged scale, a partial plan of the fifth part shown in FIGURE 7, FIGURE 9 is an elevation similar to FIGURE 7, but showing a modification of the fifth part, FIGURE 10 is a plan of a second embodiment of an implement, shown coupled to a tractor, FIGURE 11 is, on an enlarged scale, an elevation of a detail of the implement shown in FIGURE 10, viewed in the direction of the arrow XI in FIGURE 10, parts of the implement having been removed for the sake of clarity, FIGURE 12 is a part sectional plan of the detail shown in FIGURE 11, and FIGURE 13 is a plan of a part of a third embodiment of an implement, shown coupled to a tractor.

Referred first to FIGURES 1 to 9, the first embodiment of the implement includes a frame having two relatively movable frame parts 1A and 1B. The first frame part 1A is in the form of a parallelogram structure, two opposite sides of which are constituted by frame beams 1 and 2. The forward ends of the frame beams 1 and 2 are pivotally coupled with interconnected beams 3 and 4. The beam 3 has a support 5, to which the forward end of the beam 1 is secured with the aid of a vertical pin 6 (FIGURE 3, and the forward end of the beam 2 is secured to one end of the beam 4 with the aid of a vertical pin 7. The rearward ends of the beams 1 and 2 are pivotally coupled with interconnected beams 8 and 9 with the aid of vertical pins 10 and 11, respectively. A sector-shaped plate 12 is secured to the upper side of the beam 3 and the support 5, the plate 12 having a plurality of holes 13, and the forward end of the beam 1 is provided with a strip 14 (see FIGURE 2) which is located above the plate 12 and which has a hole to correspond to any one of the holes 13, so that a locking pin 15 of known structure can be inserted into the hole in the strip 14 and any corresponding hole 13 in the plate 12.

The beams 3 and 4 are interconnected through the intermediary of a bearing sleeve 16 in which a shaft 17 is journalled. A support 18, which is constructed in the form of a wheel, is rotatably mounted on the shaft 17 by a bearing sleeve 19. Similarly, the beams 8 and 9 are interconnected through the intermediary of a bearing sleeve 20 in which a shaft 21 is journalled, and a wheel-shaped support 22 is rotatably mounted on the shaft 21 by a bearing sleeve 23.

Between the supports 18 and 22, six rake members constructed in the form of rake bars 24 are arranged so as to extend between and parallel to the beams 1 and 2. A plate 35 is welded to each of the bearing sleeves 19 and 23 of the supports 18 and 22 respectively, and a plate 26, which is slidable on the respective bearing sleeve, is secured to each of the plates 25 by bolts 27 (see FIGURE 5, which shows the support 18).

The ends of a plurality of spokes are clamped between the plates 25 and 26 by the bolts 27, a pair of adjacent spokes 28 and 29 being made from a single piece of bent resilient steel wire. Each bolt 27 is located between the ends of a respective pair of spokes 28 and 29, each of which pairs has bent end portions 30 and 31. The spokes 28 and 29 support a felly 32 having holes through which the spokes are passed. The two spokes of each pair of spokes made from one piece of bent wire, are inter-connected by an integral portion 33, which extends along the outer circumference of the felly 32.

The felly 32 is provided at its periphery with six bearing sleeves 34, the axes of which extend parallel to the axis of rotation of the wheel-shaped support, and by which the rake bars 24 are rotatably supported (see FIGURE 3). For this purpose, each rake bar 24 is provided with a vertically arranged bearing sleeve 35 which is accommodated between the limbs of a fork 36, and which is pivotally connected to the fork 36 by a vertical pin 37 secured against axial displacement in the bearing sleeve 35. The fork 36 is fastened to a horizontal pin 38 which is mounted in the bearing sleeve 34 and is secured against axial displacement therein. Each rake bar 24 is of T-section having limbs 39, 40 and 41, the limb 39 being directed upwardly from the limbs 40 and 41 which extend substantially horizontally. In the limb 40 of each T-section rake bar are formed holes 42, through which tines 43 are passed, a straight portion of each tine extending substantially vertically and at right angles to the rake bar 24.

Each tine 43 is made from a single piece of resilient steel wire, and has a part bent in the form of a hairpin having a portion 44 and a portion 45, the end of the portion 45 being secured by a bolt 46 to the limb 39 of the T-section rake bar. As may be seen from FIGURE 7, the portions 44 and 45 of the hairpin-shaped part and the bolt 46 are located to one side of the limb 39, so that no parts of the tines project above the upper side of each rake bar. The hairpin-shaped part of each tine extends substantially longitudinally with respect to the respective rake bar, and is located above the limb 40, whereas the tine 43 extends below the limb 40. The holes 42 in the rake bars are of sufficient diameter to allow the tines 43 to turn about the axes of the respective portions 44 when the tines are deflected in a direction at right angles to such axes.

As an alternative, the tines may be shaped as shown in FIGURE 9. In this case, two adjacent tines 47 and 48, which are passed through the holes 42 in the limb 40, are made from a single piece of resilient material, for example, steel wire. The tine 47 has a portion 49 which is continued as a parallel portion 50, and the tine 48 similarly has parallel portions 51 and 52. The portions 50 and 52 are aligned and form an integral connection between the two tines 47 and 48. The portions 50 and 52 are clamped tight between the limb 39 of the rake bar 24 and a small plate 53 by a bolt 54.

Rods 55 are arranged between the beams 1 and 2 (see FIGURES 1, 5 and 6). The rods 55 are located in planes extending parallel to the wheel-shaped supports 18 and 22, and the ends of the rods are provided with vertical pivots 56 and 57, which are disposed in holes in the beams 1 and 2 respectively. The vertical pivots are secured against axial displacement in the holes by pins 57A and fixed washers 57B.

The bearing sleeve 19 has secured thereto a sprocket wheel 59 adapted to be driven by a chain 60 from a further sprocket wheel 61 fixed to a shaft 62 which is journalled in a bearing 63 secured to the beam 3 by webplates 64 (see FIGURES 3 and 5). The shaft 62 is adapted to be driven from the power take-off shaft of the tractor to which the implement is coupled when in use. In this embodiment the transmission ratio between the sprocket wheels 59 and 61 is such that the number of revolutions of the support 18 is at least half the number of revolutions of the power take-off shaft of the tractor.

In order to couple the implement to a tractor, the frame has a second part 1B, which includes a horizontal frame beam 65 having at its center a vertical post 66. The frame beam 65 is provided at its ends with downwardly extending strips 67, which are braced by further strips 68 (FIGURE 4). The strips 67 have pins 69 at their lower ends, with the aid of which pins they may be attached to the lower lifting links 70 of the three-point lifting device of a tractor 171. The upper end of the beam 66 is provided with an upstanding fork 72, to which the upper link 73 of the lifting device of the tractor 71 can be attached with the aid of a pin 72A (FIGURES 1 and 3) passing through a hole in the end of the link 73 and two aligned holes 72B (FIGURE 5) in the fork 72.

To permit the attachment of the first frame part, consisting of the parallelogram structure, to the second frame part, which is adapted to be coupled to the lifting device, the beam 3 has a plate 74 welded thereto at one end, the plate having a hole 75 (FIGURES 1 and 3), and the beam 3 has at the other end a spring structure 76 (FIGURES 1 and 4).

Referring now in particular to FIGURE 4, the spring structure 76 includes a vertical hollow cylinder 77 having diametrically opposite slots 78 formed therein. A piston-like body 79 is accommodated within the cylinder 77 so as to be axially displaceable therein. The body 79 is formed with a hole 80. A compression spring 81 is arranged between the body 79 and the bottom 77A of the cylinder 77, and above the body 79 a compression spring 82 is arranged, the upper end of which bears against a lid 83 which is secured to the cylinder 77 by bolts 84. Each strip 67 has a hole 85 formed therein. The two frame portions are pivotally attached to each other by a bar 86 passing through the hole 75 in the plate 74, the holes 85 in the strips 67, the slots 78 in the cylinder 77 and the hole 80 in the piston-like body 79. The bar 86 is horizontal and is secured against axial displacement by washers 87 and pins 88.

A spring structure 89 (FIGURE 3) is disposed between the upper ends of the vertical post 66 and the vertical pin 6, thus forming a resilient connection between the two frame parts. The spring structure 89 includes an outer tube 90 which is pivotally connected, with the aid of a pin 91, to two lugs 92 secured to the upper end of the post 66.

A circular plate 93 is secured to the upper end of an inclined rod 95 with the aid of nuts 94, the plate 93 being arranged to slide in the tube 90. At the other end of the rod 95 is a bearing sleeve 96, and a pivot pin 97 passes through the bearing sleeve 96 and through holes in two vertical lugs 98 secured to the upper end of the vertical pin 6. The rod 95 passes through a hole in a cover 99 at the lower end of the tube 90. Between the cover 99 and the plate 93, and surrounding the rod 95, is arranged a compression spring 100. A further compression spring 102 is arranged between the cover 99 and a washer 101 welded to the rod 95.

The implement is supported at its forward end by the tractor 71 and is supported at its rear end by a caster ground wheel 103 which is arranged to rotate about a horizontal axle 103A secured to a vertical shaft 104, which is in turn journalled in a bearing sleeve 105 secured to the shaft 21. The wheel 103 is vertically adjustable in known manner by axial displacement of the vertical shaft 104 in the bearing sleeve 105.

The operation of the implement will now be described.

The power take-off shaft of the tractor 71 is connected to the shaft 62 of the implement. When the tractor moves forward over the ground in the direction indicated by the arrow 106 in FIGURE 1, the power take-off shaft of the tractor rotates in such a direction as to turn the supports 18 and 22 in the direction indicated by the arrow 58 in FIGURE 5.

When the implement is arranged as shown in FIGURE 1, it operates as a side-delivery rake which displaces material lying on the ground to the left, viewed in the direction of travel 106. The material to be worked, for example hay or grass, is engaged by the tines 43, secured to the rake bars 24. The straight portions of the tines 43 are resilient and are capable of deflection if they contact any obstructions or unevennesses of the ground. The straight portions of the tines 43 are also capable of deflection by turning about the axes of the respective portions 44, thus torsionally stressing the latter portions. This deflection of the tines may occur readily, since in the lower positions of the rake bars 24, when the tines are in contact with the ground or the crop lying thereon or both, the portions 44 of the tines are located in front of the limbs 39 of the rake bars (with reference to the direction of movement of the rake bars in their lowest positions). The material engaged by the foremost tines of the implement is laterally displaced to lie in front of the succeeding tines of the implement. Consequently the material is displaced to the left (with reference to the direction of travel 106) to form a swath.

During the rotation of the rake bars 24, the tines 43 pass between the rods 55, which act as scraping members for the tines, thus ensuring that little material adheres to the tines 43. Also the rods 55 prevent material engaged by the implement accumulating against the rake bars 24.

The frame beams of the parallelogram structure are located at a level substantially midway between the uppermost and lowermost levels reached by the rake bars when the latter are rotated in operation.

The implement may be brought to a second working position in which it may operate as a tedder. The second working position is shown in FIGURE 2. To bring the implement from the first working position to the second working position, the locking pin 15 is first withdrawn from a hole 13 in the plate 12. The parallelogram structure which forms the first frame part is then moved horizontally towards the position shown in FIGURE 2, the rear end of the implement being supported by the caster ground wheel 103. When the first frame part has reached the position shown in FIGURE 2, the pin 15 is placed in a suitable hole 13 in the plate 12 in order to fix the first frame part in the new position. To allow the movement of the first frame part, the beams 1 and 2 turn about the axes of the pins 6, 10 and 7, 11, respectively, and the rake bars 24 turn about the axes of the vertical pins 37. The axes of the pins 6 and 7, and the axes of the pins 37 associated with the support 18, are located in a first vertical plane, whereas the pins 10 and 11, and the axes of the pins 37 associated with the support 22, are located in a second vertical plane parallel to the first.

In the second working position the supports, with the rake bars, are rotated in the same direction as in the first working position, so that the tines 43 again displace material lying on the ground to the left. Since the tines operate in the same direction in both working positions, they may be constructed in such a manner as to perform an efficient raking action in both working positions. In the second working position, material displaced by the foremost tines is not further displaced by the succeeding tines of the implement, since the rake bars extend to the right (with reference to the direction of travel 106). Thus the material lying on the ground and engaged by the tines of the implement, is tedded. The tedded material is spread evenly over the ground to facilitate drying thereof. Since the rods 55 extend parallel to the supports 18 and 22 and they are vertically pivoted to the frame beams 1 and 2, they extend in vertical planes parallel to the supports 18 and 22 in the second working position also, so that the tines 43 again pass between the rods and the latter act as scraping members.

It will be appreciated that the sides of the rake bars which face the material to be worked when the implement occupies the first working position, are remote from the material to be worked when the implement occupies the second working position. Since the fellies 32 of the supports 18 and 22 are carried by the resilient spokes such as 28 and 29, the fellies are capable of resilient deflection, so that the rake bars 24, which are attached thereto, are capable of resilient movement in order to accommodate unevennesses of the ground.

The first frame part is connected to the second frame part about the bar 86 so that the first frame part, including the rake bars 24, is pivotable with respect to the second frame part which is attached to the three-point lifting device of the tractor 71. Pivoting of the two frame parts with respect to each other is limited by the spring structure 89 including the two compression springs 100 and 102, which limit downward and upward movement, respectively, of the first frame portion. The rod 95 passes through the hole in the cover 99 which thus constitutes a guide for the rod 95 during movement of the latter.

To adjust the pressure of the tines 43 on the ground or, if the tines are not in contact with the ground, to adjust the distance of the tines above the ground, the lifting device of the tractor 71 can be moved either up or down, and the ground wheel 103 can be adjusted vertically within the bearing sleeve 105.

The hole 75 in the plate 74 has a diameter greater than that of the adjacent end of the bar 86, and the other end of the bar 86 is disposed in the slots 78 formed in the cylinder 77, so that the first frame part of the implement may move vertically with respect to the bar 86 about an axis extending substantially in the intended direction of travel 106, and passing substantially through the plate 74. This movement of the first frame part is resiliently opposed by the spring structure 76 fixed to the beam 3. Thus the first frame part may move downwardly against the action of the compression spring 82, or upwardly against the action of the compression spring 81.

Referring now to FIGURES 10, 11 and 12, the second embodiment of the implement includes a frame having two relatively movable frame parts. The first frame part includes a frame beam 120, at one end of which is arranged a wheel-shaped support 108 similar to the supports 18 and 22 described with reference to the first embodiment of the implement. The support 108 has six bearing sleevs 108A, similar to the sleeves 34 of the supports 18 and 22, and has a central bearing sleeve 109 which is rotatable upon a shaft 110. The shaft 110 is pivotable about a vertical pin 129 within a fork 128 fixed to the end of the beam 120. A support 111 is arranged at the other end of the beam 12. The support 111 is shown in more detail in FIGURE 11, and includes an inner ring 112 which is secured with the aid of three rods 113 to a short beam 114, the axis of which is close to the axis of the ring 112. A V-belt pulley 115 is rotatable around the ring 112. Web plates 116, integral with the V-belt pulley 115, carry six bearing sleeves 117, and six rake members in the form of rake bars 107 arranged between the supports 111 and 108 in the bearing sleeves 117 and 108A. The arrangement of the rake bars 107 is similar to the arrangement of the rake bars 24 described with reference to the first embodiment of the implement. A fork 118 is fixed to the rear end of the beam 114, and a further fork 119, fixed to the forward end of the beam 120, is pivotally secured to the fork 118 by a vertical pin 121 passing through corresponding holes in the limbs of the forks 118 and 119, the pin 121 being secured against axial displacement in the holes. The arrangement of the forks 118 and 119 is such that the axes of the ring 112 and the beam 120 intersect. The upper limb of the fork 119 is elongated to form a strip 122 to which a tube 123 is secured. A locking pin 124 is arranged in the tube and this locking pin is urged by a spring 124A into any corresponding slot of a number of slots 126 formed in an upstanding arcuate strip 125 concentric with the pin 121. The strip 125 is secured to a sector-shaped plate 127 which is in turn secured to the beam 114 and to two of the rods 113. The pin 124 may be withdrawn from the slot 126 into which it is urged by the spring 124A, so that the beam 120 may be turned about the axis of the pin 121, and the pin 124 thereafter replaced in a further slot 126. The shaft 114 is secured to a beam 120A which is similar to the frame beam 3 described with reference to the first embodiment of the implement. Thus the beams 120, 120A and 114 constitute the first frame part of the second embodiment of the implement.

In order to couple the implement to a tractor, the frame has a second part, which is similar to the second frame part of the first embodiment of the invention. Therefore, elements of this second frame part are designated by the same reference numerals as the corresponding elements of the second frame part of the first embodiment of the implement.

A support 140 is fixed to the beam 120A, and secured to the free end thereof is the lower end of an inclined spring structure 89 which is the same as the spring structure 89 of the first embodiment. The frame beam 120A is elongated to form a portion 130 which has secured thereto a vertical bearing 131. A caster ground wheel 132 is connected with the bearing sleeve 131 in known manner. A vertical bearing sleeve 133 is welded to the beam 120A, and a rod 134 is slidably mounted in this bearing sleeve 133 and has a plurality of horizontal holes formed therein whereby it may be fixed in a number of positions with respect to the bearing sleeve 133 with the aid of a pin (not shown). The lower end of the rod 134 is provided with two feet 135 so that the implement may be supported by the caster ground wheels 103 and 132 and by the rod 134, when the implement is uncoupled from the tractor.

The implement has a shaft 62 which is arranged to be driven by the power take-off shaft of the tractor, and this shaft 62 has a V-belt pulley 136 fixed thereto. A V-belt 137 connects the pulleys 115 and 136 so that the supports 108 and 111, with the rake bars 107 may be driven. The rake bars 107 have tines similar to the tines 43 of the first embodiment.

As shown in FIGURE 10, the tractor 71 may be provided with a mowing beam 138 located to one side of the tractor.

The operation of the second embodiment of the implement is substantially the same as the operation of the first embodiment.

When the implement is arranged in the first working position, shown in full lines in FIGURE 10, the implement operates as a side-delivery rake when it is moved over the ground by the tractor 71 in the direction indicated by the arrow 106. The supports 111 and 108 and the rake bars 107 rotate in the direction indicated by the arrow 58 in FIGURE 11 and the tines displace material lying on the ground to the left to form a swath, as described with reference to the first embodiment of the implement.

The implement may be brought to a second working position which is shown in broken lines in FIGURE 10. To bring the implement from the first working position to the second working position, the spring-loaded pin 124 is first withdrawn from a slot 126 in the arcuate strip 125. The beam 120 is then moved horizontally about the axis of the pin 121 towards the position shown in broken lines in FIGURE 10, the rear end of the implement being supported by the caster ground wheel 103. When the beam 120 has reached the position shown in broken lines in FIGURE 10, the spring loaded locking pin 124 is allowed to enter a further slot 126 in the arcuate strip 125. During the movement of the beam 120, the beam turns about the axes of the pins 121 and 129, and the rake bars 107 turn about the axes of the vertical pins by which they are connected to the supports 108 and 111. The axis of the pin 121 and the axes of the pins associated with the support 111 are located in a first vertical plane, wheras the axis of the pin 129 and the axes of the pins associated with the support 108 are located in a second vertical plane parallel to the first.

In the second working position the supports, with the rake bars, are rotated in the same direction as in the first working position, so that the tines again displace material lying on the ground to the left. In this working position, material displaced by the foremost tines is not further displaced by the succeeding tines of the implement, since the rake bars extend to the right (with reference to the direction of travel 106). Thus the material lying on the ground and engaged by the tines of the implement, is tedded. It will be noted from FIGURE 10 that the rake bars of the implement, when arranged in the second working position, are located mainly to one side of the tractor and behind the mowing beam 138 (with reference to the direction of travel 106). Consequently the implement is arranged to ted the material which has been mown by the mowing beam 138 during the movement of the tractor 71 over the ground. The material mown by the mowing beam is displaced by the tines of the implement in a direction towards the path of the towing tractor.

When the implement shown in FIGURE 10 is uncoupled from the tractor 71, the implement is supported by the caster ground wheels 103 and 132 and by the rod 134. It will be appreciated that the first embodiment of the implement may also have a supporting wheel and a supporting rod so that the implement may rest on the ground when uncoupled from the tractor. In place of the wheel 132 and the rod 134 described with reference to FIGURE 10, either embodiment of the implement may have two wheels or two rods, similar to the wheel 132 or the rod 134, respectively.

Although the rake members of the implements described above are driven by the tractor motor via the power take-off shaft of the tractor, it will be seen that the rake members may be driven by other means, for example from a ground wheel of the implement.

It may be advantageous to arrange the implement so that it may act as a tedder at a location immediately behind the tractor. This may be done by arranging the implement so that it may be moved in a direction transverse to the intended direction of travel thereof. For example, it may be possible to arrange the beam 114, together with the support 111, so that it is pivotable to 180° about the axis of the shaft 62.

This is shown in FIG. 13. In this embodiment most frame parts are similar to the frame parts of the second embodiment of the invention. Therefore elements of these frame parts are designated by the same reference numerals as the corresponding elements of the frame parts of the second embodiment of the implement. In this embodiment the beam 114 is secured to a frame beam 140, which is rotatably mounted about the shaft 62. Further is a spring-loaded locking pin 141 mounted on the frame beam 140, whereas on the beam 120A plates 142 and 143 are attached. In said plates are formed holes into any of which the locking pin 141 may be urged.

The implement may be moved in a direction transverse to the intended direction of travel thereof. Therefore the spring-loaded pin 141 is first withdrawn from a hole in the plate 142. The lifting device is then lifted whereby the beam 141 rotates about the shaft 62 over an angle of 90°. Then the lifting device is moved downwardly while the beam 141 is further rotated about the shaft 62 in the same direction till the locking pin can be inserted in a hole in the plate 143. The implement is then displaced over a distance which is twice the distance between the shaft 62 and the beam 114.

In order to cope with differing conditions of the material to be worked, the parallelogram structure of the first embodiment of the implement, and the beam 120 of the second embodiment of the implement, are adjustable in angular setting with respect to the intended direction of travel of the implements, in both working positions, by withdrawing the respective locking pin 15, or 124, from one hole 13 or slot 126, and by replacing it in a further hole or slot. Thus the angular setting of the rake members with respect to the intended direction of travel of the implement, is adjusted. It is also possible to adjust the parallelogram structure, or the beam 120, to a setting such that the rake members lie behind the tractor, with reference to the intended direction of travel thereof, so that the width of the combination of the tractor and implement is reduced for transport. For this purpose a suitable hole 13, or slot 126, is formed in the respective plate 12, or strip 125.

What I claim is:

1. An implement for working material lying on the ground which comprises a first frame part of a substantially horizontally disposed parallelogram structure, vertical pivots pivotally connecting the corners of said parallelogram structure, rotatable support means mounted in said first frame part, tine carrying bars pivotally mounted between said rotatable support means, a second frame part, draft means included in said second frame part, said first frame part connected to said second frame part at selective angles in a substantially horizontal plane whereby said implement is adjustable to operate in a plurality of working positions.

2. An implement for working material lying on the ground which comprises a first frame part of substantially horizontally disposed parallelogram structure, vertical pivots pivotally connecting the corners of said parallelogram structure, rotatable support means mounted in said first frame part, tine carrying bars pivotally mounted between said rotatable support means, tines extending normally from said tine carrying bars, scraping members pivotally secured across the parallelogram structure of said first frame part for removing an accumulation of material against said tines, said scraping members being in the form of rods pivotally connected across said parallelogram structure and extending below said bars, a second frame part, draft means included in said second frame part, said first frame part connected to said second frame part at selective angles in a substantially horizontal plane whereby said implement is adjustable to operate in a plurality of working positions.

3. An implement for working material lying on the ground which comprises a first frame part of substantially horizontally disposed parallelogram structure, pivots pivotally connecting the corners of said parallelogram structure, rotatable support means mounted in said first frame part, raking members pivotally mounted between said rotatable support means, said raking members being substantially parallel to two sides of said parallelogram structure, a second frame part, draft means included in said second frame part, said first frame part connected to said second frame part at selective angles in a substantially horizontal plane whereby said implement is adjustable to operate in a plurality of working positions.

4. An implement for working material lying on the ground which comprises a first frame part, rotatable support means mounted in said first frame part, tine carrying bars pivotally mounted between said rotatable support means, two parallel frame beams included as opposite sides of said first frame part, said frame beams being substantially mid-way between the uppermost and lowermost levels of said tine carrying bars, a second frame part, draft means included in said second frame part, said first frame part connected to said second frame part at selective angles in a substantially horizontal plane whereby said implement is adjustable to operate in at least two different working positions so that the sides of said bars which face the material to be worked in one position are remote from the material in another position.

5. An implement for working material lying on the ground which comprises a first frame part, rotatable support means mounted in said first frame part, tine carrying bars pivotally mounted between said rotatable support means, resilient tines extending from said bars, each of said tines having a raking portion which extends normally from said bars and a further portion lying substantially parallel to said bars wherein when said raking portion is deflected said further portion is tortionally stressed, a second frame part, draft means included in said second frame part, said first frame part connected to said second frame part at selective angles in a substantially horizontal plane whereby said implement is adjustable to operate in a plurality of working positions, holes included in said bars, said tines passing through said holes whereby said raking portion is on one side of said hole and the associated further portion is located on the other side of said hole.

6. An implement for working material lying on the ground which comprises a first frame part, rotatable support means mounted in said first frame part, tine carrying bars pivotally mounted between said rotatable support means, said bars being of T-cross section, holes included in the cross portion of the said bars, resilient tines arranged along said bars wherein raking portions of said tines extend through said holes and further portions of said tines are secured along the vertical portions of said bars, a second frame part, draft means included in said second frame part, said first frame part connected to said second frame part at selective angles in a substantially horizontal plane whereby said implement is adjustable to operate in a plurality of working positions.

7. An implement for working material lying on the ground which comprises a first frame part, rotatable support means mounted in said first frame part, said support means being in the form of wheels having central hubs, resilient spokes included in said support means connecting the central hubs to the periphery of said support means, substantially parallel tine carrying bars pivotally connected to the peripheries of said supports, a second frame part, draft means included in said second frame part, said first frame part connected to said second frame part at selective angles in a substantially horizontal plane whereby said implement is adjustable to operate in a plurality of working positions.

8. An implement for working material lying on the ground which comprises: a first frame part; rotatable support means mounted in said first frame part; said support means each including a felly, a central hub, and spokes; at least two of such spokes being integral and made of a single piece of resilient material; tine carrying bars pivotally mounted between said rotatable support means; a second frame part; draft means included in said second frame part; said first frame part connected to said second frame part at selective angles in a substantially horizontal plane whereby said implement is adjustable to operate in a plurality of working positions.

9. An implement as claimed in claim 8 wherein the felly of each of said support means contains at least two holes, a resilient portion joining at least two spokes of said support members along the outer surface of the felly.

10. A farm implement for tedding and raking material lying on the ground which comprises: A first frame part; a forward, after, and two side, frame beams pivoted together at their ends in a substantially horizontally disposed parallelogram arrangement, included in said first frame part; a second frame part; draft means incorporated in said second frame part; said forward beam connected to said second frame part; supporting members rotatably mounted on the forward and after frame beams; pivot members arranged around the periphery of said supporting members; tine carrying bars mounted between said pivot members substantially parallel to and along sides said side frame beams; tines depending from said bars; motive mean to rotate said supporting members together with said bars; and securing means to secure selectively said frame beams in a fixed relationship whereby said implement is adjustable to operate as a tedder and as a side delivery rake.

11. A farm implement for tedding and raking material lying on the ground which comprises a horizontally extended beam having a forward part and an after part, draft means, securing means securing said draft means and said beam in selective angular relationship, a forward supporting member rotatably mounted on said securing means forward of said beam, an after supporting member rotatably mounted at the after part of said beam in a parallel relationship with said forward supporting member, pivot members arranged around the periphery of said supporting members, tine carrying bars mounted between corresponding pivot members on said supporting members, said bars being in substantially parallel relationship with said beam and adapted to rotate around it, and ground engaging support means interconnected with said beam.

12. A farm implement in accordance with claim 11 which includes a further ground engaging support means interconnected to said draft means.

13. An implement for working material lying on the ground comprising a first frame part, tine-carrying bars, at least one adjustable frame beam included in said first frame part extending substantially parallel to said tine-carrying bars in all positions, parallel rotatable support means, said bars being pivotally connected to said support means mounted in said first frame part, the axes of the connections between said bars and support means being substantially coplanar with a pivoted axis about which said frame beam is adjustable, a second frame part, draft means included in said second frame part, said first frame part being connected to said second frame part at selective angles in a substantially horizontal plane whereby said implement is adjustable to operate in a first and second working position and whereby the sides of said bars which face the material to be worked in one position are remote from the material in the other position.

14. The implement of claim 13 wherein fastening means for coupling said implement to a tractor lifting device is provided in said draft means.

15. An implement for working material lying on the ground comprising a first frame part, tine-carrying bars, at least one adjustable frame beam included in said first frame part extending substantially parallel to said tine-carrying bars in all positions, parallel rotatable support means, said bars being pivotally connected to said support means mounted in said first frame part, the axes of the connections between said bars and support means being substantially coplanar with a pivoted axis about which said frame beam is adjustable, a second frame part, draft means included in said second frame part, securing means incorporated in said second frame part, said first frame part being connected to said securing means at selective angles in a substantially horizontal plane whereby said implement is adjustable to operate in a first raking and a second tedder working position so that the sides of said bars which face the material to be worked in one position are remote from the material in the other position.

16. The implement of claim 15 wherein the securing means includes vertical pivot means whereby the first frame part is adapted to pivot about said vertical pivot means.

17. An implement for working material lying on the ground comprising a first frame part, raking members, at least one adjustable frame beam included in said first frame part extending substantially parallel to said raking members in all positions, parallel rotatable support means, said raking members being pivotally connected to said support means mounted in said first frame part, the axes of the connections between said members and support means being substantially coplanar with a pivoted axis about which said frame beam is adjustable, a second frame part, draft means included in said second frame part, said first frame part being connected to said second frame part at selective angles in a substantially horizontal plane whereby said implement is adjustable to operate in a first and second working position so that the sides of said raking members which face the material to be worked in one position are remote from the material in the other position.

18. An implement for working material lying on the ground comprising a first frame part, tine-carrying bars, at least one adjustable frame beam included in said first frame part extending substantially parallel to said tine-carrying bars in all positions, parallel rotatable support means, said bars being pivotally connected to said support means mounted in said first frame part, the axes of the connections between said bars and support means being substantially coplanar with a pivoted axis about which said frame beam is adjustable, a second frame part, draft means included in said second frame part, power transmission means included in said second frame part, said transmission means operatively connected to said rotatable support means, said first frame part being connected to said second frame part at selective angles in a substantially horizontal plane whereby said implement is adjustable to operate in a first and second working position so that the sides of said bars which face the material to be worked in one position are remote from the material in the other position.

References Cited in the file of this patent
UNITED STATES PATENTS

| | | |
|---|---|---|
| 960,950 | Keeser | June 7, 1910 |
| 2,436,475 | Jones et al. | Feb. 24, 1948 |
| 2,714,796 | Haupt et al. | Aug. 9, 1955 |